US009830132B2

(12) United States Patent
Jordan et al.

(10) Patent No.: US 9,830,132 B2
(45) Date of Patent: Nov. 28, 2017

(54) INCREMENTAL USER INTERFACE DEPLOYMENT AND DEPRECATION

(71) Applicant: Box, Inc., Los Altos, CA (US)

(72) Inventors: David Jordan, Cupertino, CA (US); Christopher Ling, Los Altos, CA (US); Matthew A. Basta, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/853,866

(22) Filed: Sep. 14, 2015

(65) Prior Publication Data

US 2017/0075663 A1     Mar. 16, 2017

(51) Int. Cl.
G06F 9/44         (2006.01)
G06F 17/22        (2006.01)
G06F 17/21        (2006.01)

(52) U.S. Cl.
CPC .............. *G06F 8/38* (2013.01); *G06F 8/71* (2013.01); *G06F 17/218* (2013.01); *G06F 17/227* (2013.01); *G06F 17/2247* (2013.01)

(58) Field of Classification Search
None
See application file for complete search history.

(56) References Cited

U.S. PATENT DOCUMENTS

| 8,429,604 | B1 * | 4/2013 | Blas | G06F 8/75 |
| | | | | 717/109 |
| 2014/0026115 | A1 * | 1/2014 | Bank | G06F 8/38 |
| | | | | 717/113 |
| 2014/0281399 | A1 * | 9/2014 | Rash | G06F 9/30145 |
| | | | | 712/209 |
| 2016/0321234 | A1 | 11/2016 | Basta | |
| 2017/0075663 | A1 | 3/2017 | Jordan et al. | |

(Continued)

OTHER PUBLICATIONS

"asp.net Themes and Skins." MSDN, Microsoft, Sep. 23, 2011, web.archive.org/web/20110923155212/http://msdn.microsoft.com/en-us/library/ykzx33wh(d=printer).aspx. Accessed Jul. 6, 2017.*

(Continued)

*Primary Examiner* — Wei Zhen
*Assistant Examiner* — Binh Luu
(74) *Attorney, Agent, or Firm* — Vista IP Law Group, LLP

(57) ABSTRACT

An original UI configuration is formed by a combination of a first user interface structural component portion, a first user interface style code portion, and a first behavioral code portion. When a variation of the first UI feature or a new feature is to be implemented, a second UI configuration is deployed, where the second UI configuration is formed by a second user interface structural component portion, a second user interface style code portion, and a second behavioral code portion. The second UI configuration implements a variation of the first UI feature. Embodiments deploy a third UI configuration formed by the second user interface structural component portion, a third user interface style code portion, and the second behavioral code portion. The third UI configuration emulates the original UI configuration using the second behavioral code portion. The third configuration or the second configuration can be enabled based on a software switch.

17 Claims, 17 Drawing Sheets

(56) References Cited

U.S. PATENT DOCUMENTS

2017/0132181 A1    5/2017   Van As et al.
2017/0132185 A1    5/2017   Basta et al.

OTHER PUBLICATIONS

"Skin (computing)." Wikipedia, Feb. 25, 2014, web.archive.org/web/20140225053158/https://en.wikipedia.org/wiki/Skin_(computing). Accessed Jul. 6, 2017.*

"Walkthrough: Customizing a Web Site Using Themes in Visual Studio." Microsoft Developer Network, Sep. 10, 2005, msdn.microsoft.com/en-us/library/zcsbskx7. Accessed Jul. 6, 2017.*

Pot, Justin. "How to Make Windows 8 or 8.1 Look Like Windows 7 or XP." Make Use Of, Oct. 7, 2014, www.makeuseof.com/tag/make-windows-8-8-1-look-like-windows-7-xp/.*

\* cited by examiner

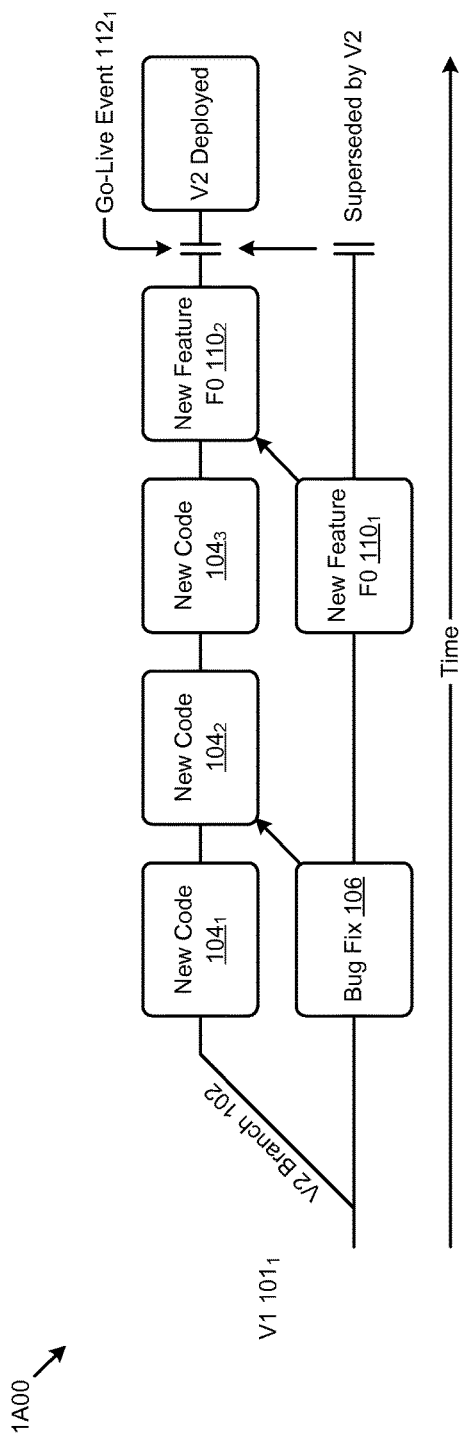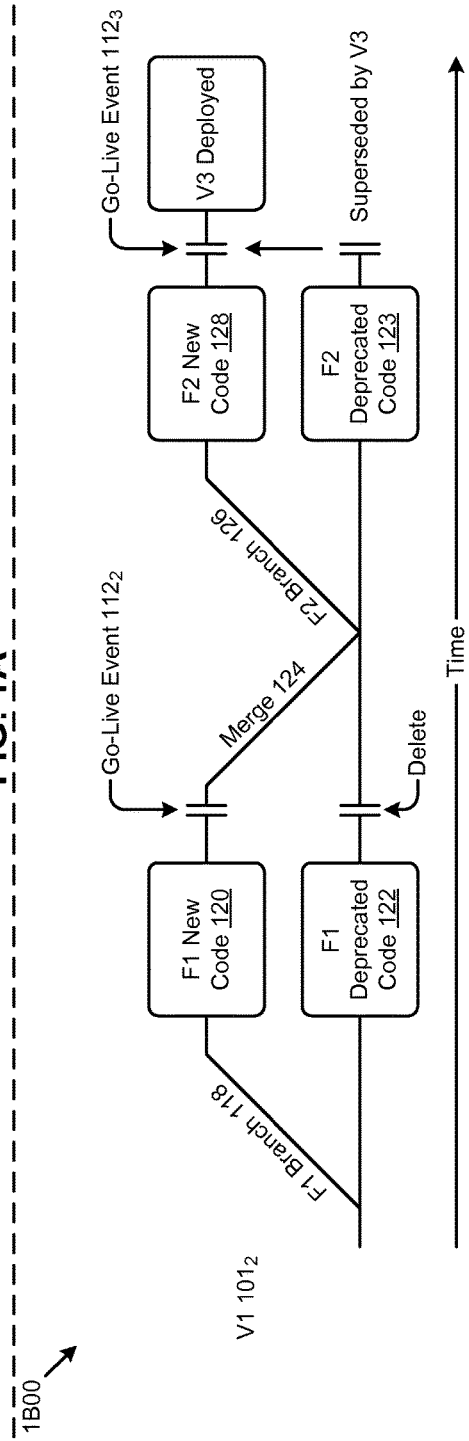
FIG. 1A
FIG. 1B

INCREMENTAL USER INTERFACE DEPLOYMENT AND DEPRECATION

FIELD

This disclosure relates to zero-downtime user interface deployment, and more particularly to techniques for incremental user interface deployment and deprecation using spoofing.

BACKGROUND

Software products are often in a near constant state of improvement. An initial version might be sent "out to the field", and sometime later an improved version is released and again sent "out to the field". Some software products are delivered as web applications comprising (1) hypertext markup language (HTML) that codifies the structure of a user interface (UI) that runs on a client machine, (2) style code (e.g., in a cascading style sheet) that deals with the look-and-feel and other presentation aspects of elements in the HTML, and (3) JavaScript code that brings behavior to the HTML elements. Such software products may also have a "back-end" that runs on a server. Code for the UI (e.g., HTML, CSS and JavaScript) as well as code for the back-end all need to stay "in-synch". One legacy approach is to deploy incremental improvements in the form of configurations of UI elements (HTML), presentation code (CSS) and behavior code (JavaScript). Unfortunately this legacy technique forces the release of an entirely new code base—possibly also requiring updates to back-end code—when deploying the improved version. This legacy technique has further deficiencies, at least in that the improved version cannot be deployed until all of the code is completed. This deficiency often leads to very long upgrade cycles (e.g., many months or years) and results in an undesirable "big bang" effect for each release.

What is needed is a technique or techniques to improve over legacy approaches.

SUMMARY

The present disclosure provides a detailed description of techniques used in systems, in methods, and in computer program products for incremental user interface deployment and deprecation using spoofing.

The present disclosure provides systems, methods, and computer program products suited to address the aforementioned issues with legacy approaches. More specifically, the present disclosure provides a detailed description of techniques used in systems, methods, and in computer program products for incremental user interface deployment and deprecation using spoofing. Certain embodiments are directed to technological solutions for deploying new features in a new configuration where a new feature includes a "spoof" that is deployed in a configuration of HTML, CSS and JavaScript (e.g., where the configuration is a union of two configurations that comprise a spoof of "old" feature look-and-feel with new behaviors together with "new" feature look-and-feel with the new behaviors). Attendant embodiments advance the relevant technical fields, as well as advancing peripheral technical fields of code development and deployment.

Some embodiments commence upon identifying an original UI configuration formed by a combination of a first user interface structural component portion, a first user interface style code portion, and a first behavioral code portion. The original code configuration implements a first UI feature. When a variation of the first UI feature or a new feature is to be implemented, a second UI configuration is deployed, where the second UI configuration is formed by a second user interface structural component portion, a second user interface style code portion, and a second behavioral code portion. The second UI configuration implements a variation of the first UI feature. To provide incremental releases and backward compatibility, embodiments deploy a third UI configuration formed by the second user interface structural component portion, a third user interface style code portion, and the second behavioral code portion. The third UI configuration emulates the original UI configuration using the second behavioral code portion. The third configuration or the second configuration can be enabled based on a software switch. The first behavioral code portion can be deprecated or deleted.

Further details of aspects, objectives, and advantages of the technological embodiments are described herein in the following descriptions, drawings, and claims.

BRIEF DESCRIPTION OF THE DRAWINGS

The drawings described below are for illustration purposes only. The drawings are not intended to limit the scope of the present disclosure.

FIG. 1A exemplifies a dual-path version upgrade approach for deploying an upgraded version of a software product.

FIG. 1B exemplifies a dual-path feature-by-feature upgrade approach for deploying feature-by-feature upgrades of a software product.

DETAILED DESCRIPTION

Figure 2:
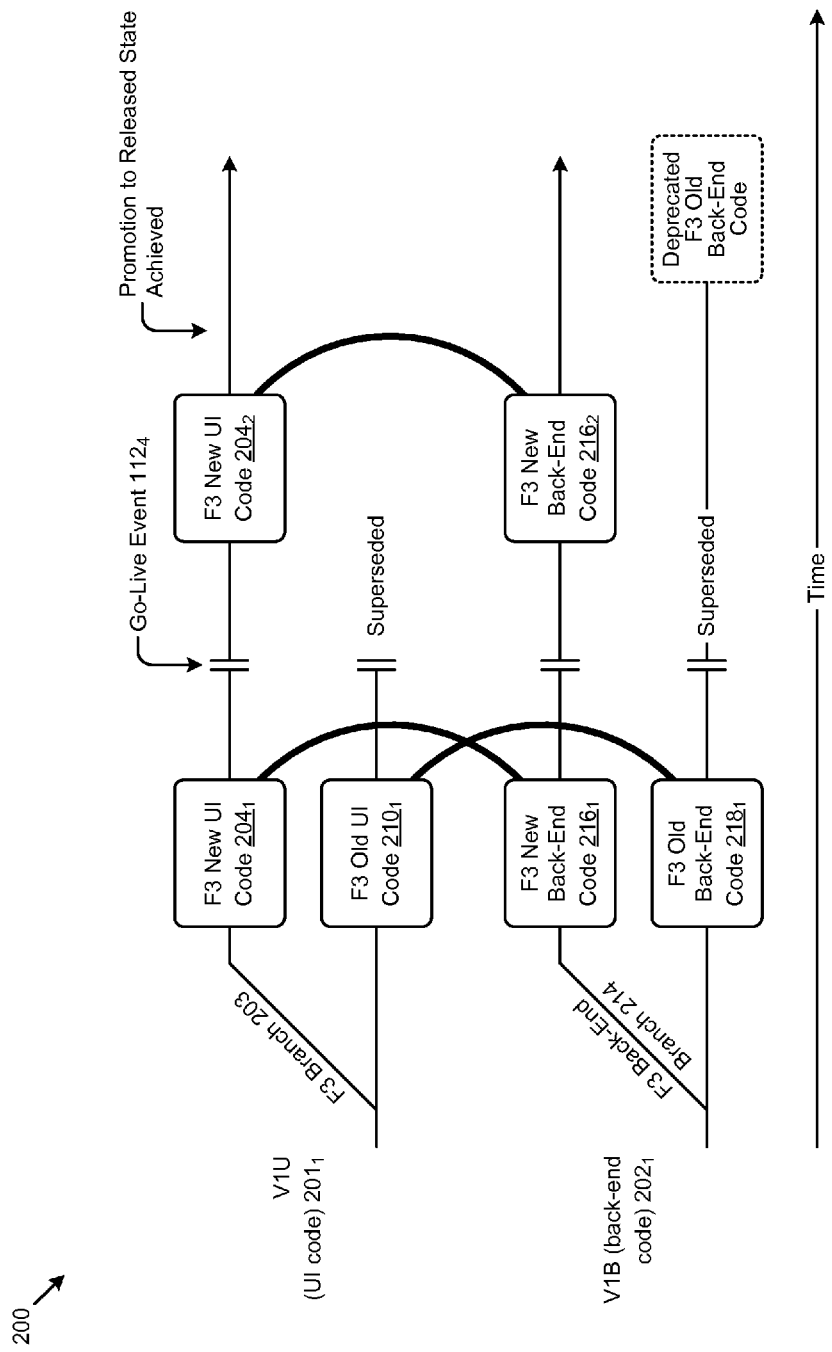
FIG. 2 exemplifies a dual-path feature-by-feature upgrade approach in systems that implement a front-end UI that relies on back-end infrastructure.

Software products are often in a near constant state of improvement. An initial version might be sent "out to the field", and sometime later an improved version is released and again sent "out to the field". Some software products are delivered as web applications having multiple portions comprising (1) user interface structural components (e.g., hypertext markup language portions) that codify structural components of a user interface that runs on a client machine, (2) style code (e.g., cascading style sheet portions) that deals with the look-and-feel and other presentation aspects of the user interface structural components, and (3) behavioral code (e.g., JavaScript code that brings behavior to the stylized user interface structural components).

Some embodiments of the present disclosure address the problem of how to release "new" behaviors (e.g., features) using "old" user interface elements and presentation styles. Some embodiments are directed to approaches for deployment of new features in a new configurations where a new feature includes a "spoof" that is deployed in a particular configurations of HTML, CSS and JavaScript. The new release is a union of two configurations that comprise a spoof of "old" feature look-and-feel with "new" feature look-and-feel with the new behaviors. More particularly, disclosed herein and in the accompanying figures are exemplary environments, systems, methods, and computer program products for incremental user interface deployment and deprecation using spoofing.

Overview

Although modern software product design is often performed under a so called "agile" regime (e.g., with incremental releases performed frequently, such as daily or weekly), some special considerations need to be given to incremental release of user interface code. Specifically, the new incremental releases should strive to avoid confusing the user (e.g., by releasing some "partly new" UI components that are mixed in with "partly old" UI components). One approach is to build and release behavioral code, and release with two independently enablable UI components: (1) the new UI code that correspond to the newly-released UI components, and (2) UI components that operate as a "spoof" of the old UI. Instances of these latter UI components are designed and coded to operate as a "spoof" of the old UI while using the newly-released behavioral code.

Some embodiments as discussed herein support the deployment of new features in a configuration where a new feature is deployed as a configuration of hypertext markup language (e.g., HTML markup), cascading style sheets (CSS), and JavaScript, which configuration is composed of a first subconfiguration comprising HTML+CSS+JavaScript to implement "old" feature look-and-feel with new behaviors together, and a second subconfiguration comprising HTML+CSS+JavaScript to implement "new" feature look-and-feel with the new behaviors. Either one of the first configuration or the second configuration can be enabled on demand. Neither the first subconfiguration nor the second subconfiguration use "old" behavior code, so the "old" behavior code can be deprecated and eventually deleted. Moreover, when the "new" feature look-and-feel with the new behaviors has been ratified (e.g., accepted by the user community), then the "old" code (e.g., the 'old' UI look-and-feel code and the 'old' behavior code can be deprecated and eventually deleted.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A exemplifies a dual-path version upgrade approach 1A00 for deploying an upgraded version of a software product. As an option, one or more variations of dual-path version upgrade approach 1A00 or any aspect thereof may be implemented in the context of the architecture and functionality of the embodiments described herein. Also, the dual-path version upgrade approach 1A00 or any aspect thereof may be implemented in any environment.

The path depicts a progression over time from an initially-deployed software product of version V1 $101_1$ through a go-live event $112_1$. The dual-path version upgrade approach 1A00 includes two concurrently-running development paths that each have a respective underlying code base. The code base is branched at V2 branch 102, at which point (as shown) new code is developed (e.g., new code $104_1$). Additional new code (e.g., new code $104_2$, new code $104_3$, V1 new feature F0 $110_1$, V2 new feature F0 $110_2$) is developed in advance of the go-live event $112_1$. During the course of development of new code, there is a respective code base to which bug fixes (e.g., bug fix 106) applied to the V1 code base must be also implemented in the V2 code base. This situation results in double work for the pool of developers (e.g., requiring some engineering time and engineering human resources to be spent on bug fixes for V1 and also some engineering time and engineering human resources to be spent on bug fixes for V2), at least until after the occurrence of go-live event $112_1$. Inasmuch as new version V2 is deployed with its respective code base, the code base of the old V1 version can be deprecated and eventually deleted. In some cases the time between a branching event (see V2 branch 102) and a corresponding go-live (go-live event $112_1$) can be long (e.g., many months or years), and some deployments will release upgrades on a feature-by-feature basis rather than wait for readiness of all of the upgraded code before going live. An approach that supports such a feature-by-feature basis is shown and described as pertains to FIG. 1B.

FIG. 1B exemplifies a dual-path feature-by-feature upgrade approach 1B00 for deploying feature-by-feature upgrades of a software product. As an option, one or more variations of dual-path feature-by-feature upgrade approach 1B00 or any aspect thereof may be implemented in the context of the architecture and functionality of the embodiments described herein. Also, the dual-path feature-by-feature upgrade approach 1B00 or any aspect thereof may be implemented in any environment.

The embodiment shown in FIG. 1B depicts a progression over time from an initially-deployed software product of version V1 $101_2$ through two go-live events (e.g., go-live event $112_2$ and go-live event $112_3$). During the progression, a first code branch is made (e.g., F1 branch 118) so as to implement "new" feature F1 using F1 new code 120. After implementation of feature F1, the code base is merged (e.g., see merge 124). In many cases, including the case shown in dual-path feature-by-feature upgrade approach 1B00, an "old" implementation of feature F1 using an "old" code base can be deprecated (e.g., see F1 deprecated code 122). At any point after the shown deprecation, the "old" code can be deleted.

Yet another feature such as an enhanced F2 (see F2 new code 128) can be implemented after branching (e.g., see F2 branch 126) and deployment (e.g., see go-live event $112_2$). In this example, the "old" code base is superseded upon the V3 deployment event (e.g., see indication of V3 deployed), and the F2 deprecated code 123 can be deleted.

The deployment scenarios of FIG. 1A and FIG. 1B apply in some software product architectures, however many software products use a client-server model, or other operational model, where a front-end communicates with a back-end. In such cases where the front-end relies on back-end infrastructure, there may be two code bases: a UI code base and a back-end code base. Such a situation is shown and described as pertains to FIG. 2.

FIG. 2 exemplifies a dual-path feature-by-feature upgrade approach 200 in systems that implement a front-end UI that relies on back-end infrastructure. As an option, one or more variations of dual-path feature-by-feature upgrade approach 200 or any aspect thereof may be implemented in the context of the architecture and functionality of the embodiments described herein. Also, the dual-path feature-by-feature upgrade approach 200 or any aspect thereof may be implemented in any environment.

The shown V1U code base (e.g., UI code base $201_1$) operates cooperatively with the shown V1B code base (see back-end code base $202_1$). Each of these two code bases can be branched in order to implement an improvement to feature F3 (e.g., see F3 branch 203 and F3 back-end branch 214). When the improvement to feature F3 is implemented in the UI code base (see F3 new code $204_1$) as well as in the back-end code base (see F3 new back-end code $216_1$), then the two portions of new code are in-sync and a go-live event (see go-live event $112_4$) can be considered after instances of F3 code (e.g., F3 new code $204_2$, and F3 new back-end code $216_2$) are enabled. Pending ratification of feature F3, the two code bases for feature F3 can be promoted to a "released" state, and the old UI code for old feature F3 (e.g., F3 old code $210_1$) as well as the old back-end code for old feature F3 (e.g., see F3 old back-end code $218_1$) is superseded. Once ratified (e.g., accepted by the user community), the old UI code for old feature F3 is deprecated and the old back-end code for old feature F3 is deprecated, and both can be eventually deleted.

In some cases, a new feature can be incrementally deployed by releasing new back-end code in advance of releasing corresponding new UI components. Such a combination can sometimes be in sync, however an improved approach is given in FIG. 3A and FIG. 3B, where the UI development of an incremental feature is pursued by development of two UI code bases upon taking two branches. One of the two UI code branches is known as a spoofing branch, and is shown and described as pertains to FIG. 3A and FIG. 3B.

Figure 3A:
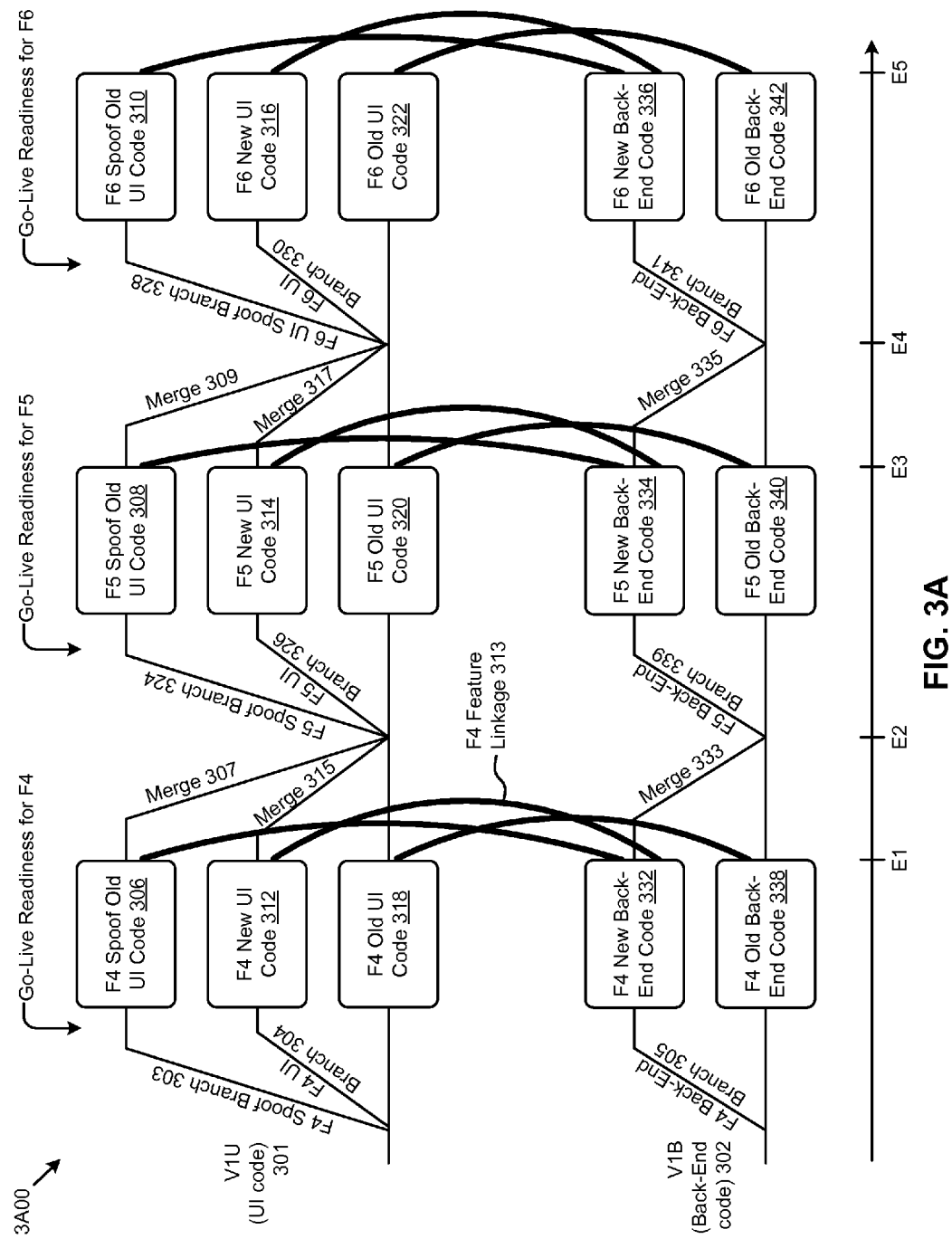
FIG. 3A exemplifies an incremental UI upgrade approach using a spoofing branch in systems that implement a front-end UI that relies on back-end infrastructure, according to some embodiments.

FIG. 3A exemplifies an incremental UI upgrade approach 3A00 using a spoofing branch in systems that implement a front-end UI that relies on back-end infrastructure. As an option, one or more variations of incremental UI upgrade approach 3A00 or any aspect thereof may be implemented in the context of the architecture and functionality of the embodiments described herein. Also, the incremental UI upgrade approach 3A00 or any aspect thereof may be implemented in any environment.

As shown, the V1U code (see UI code 301) is the subject UI code base that is intended to be incrementally improved to implement feature F4. To do so, as shown, the subject UI code base takes two branches, namely the F4 UI branch 304 and the F4 spoof branch 303. Concurrently, and as shown, the V1B code (see back-end code 302) is the subject back-end code base that is intended to be incrementally improved to implement feature F4. To do so, as shown, the subject back-end code base takes a branch, namely the F4 back-end branch 305.

Figure 3B:
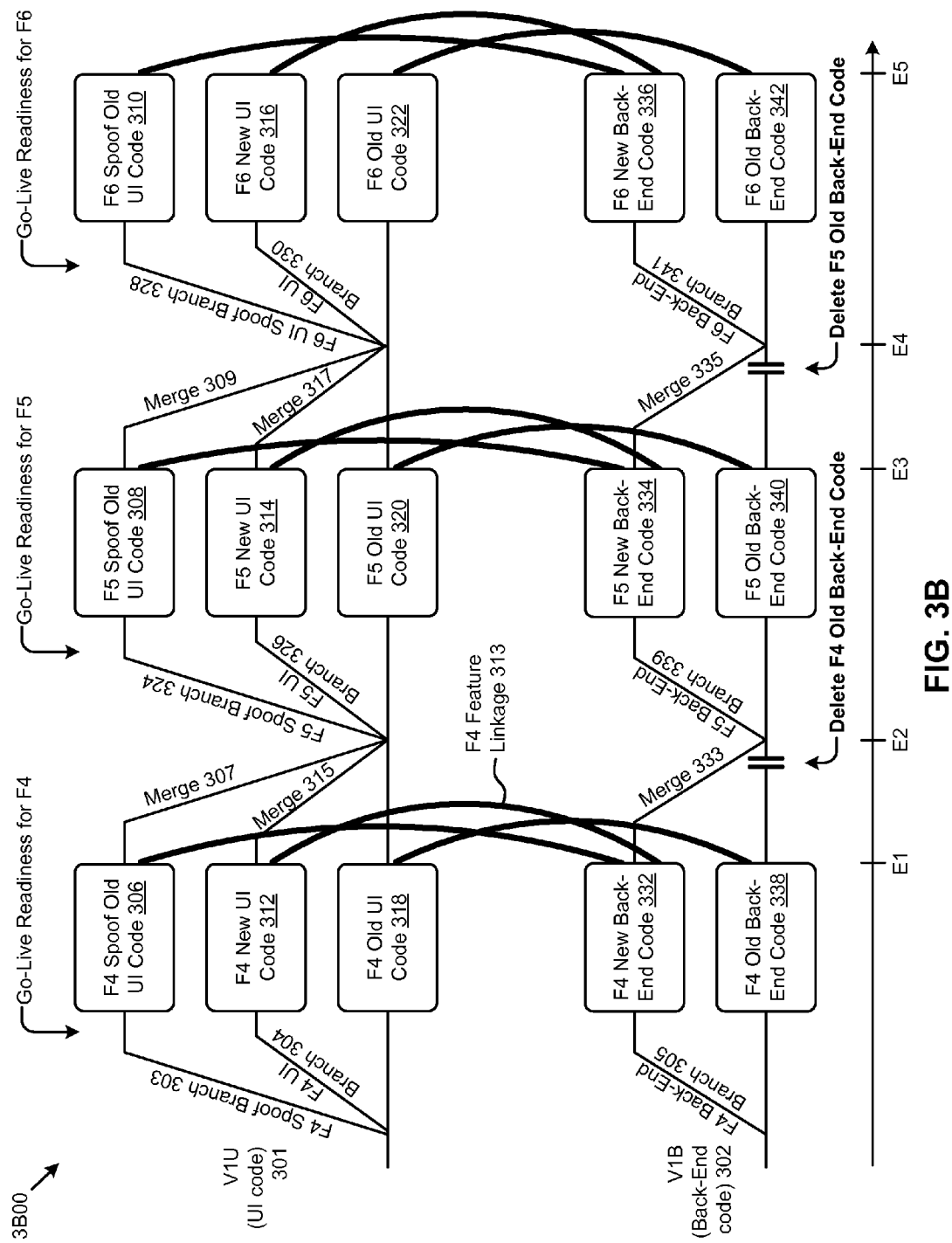
FIG. 3B exemplifies an incremental UI upgrade and old code deletion approach, according to some embodiments.

The links of FIG. 3A and FIG. 3B depict several in-synch code configurations that are depicted as links, specifically (and as shown):
- A new F4 feature linkage 313 between F4 new UI code 312 and F4 new back-end code 332.
- A link between F4 spoof old UI code 306 and F4 new back-end code 332.
- A link between F4 old UI code 318 and F4 old back-end code 338.

The link between F4 spoof old UI code 306 and F4 new back-end code 332 implements the look-and-feel of the F4 old UI code feature using the semantics of F4 new back-end code 332.

At timeline event E1, the software product has the needed code base so as to implement a variation of feature F4 using a new look-and-feel (e.g., using F4 new UI code 312) and/or the 'old' version of feature F4 using the 'old' look-and-feel, but using the 'new' back-end code (e.g., using F4 spoof old UI code 306).

Timeline event E2 depicts a point in time when the implementation of F4 spoof old UI code 306 and F4 new UI code 312 have been ratified. They both can be merged back into the V1U code base (see merge 307 and merge 315), and the code base pertaining to previous implementations of the now-ratified feature can be deleted. Also, when the implementation of F4 new back-end code 332 has been ratified, then it can be merged back into the V1 back-end code base (see merge 333).

This scenario can be repeated for additional feature upgrades or new implementations so as to follow an incremental UI upgrade approach using a spoofing branch for new features. After timeline event E2, and to implement feature F5, the F5 back-end branch 339 can be taken, the F5 UI branch 326 can be taken, and the F5 UI spoof branch 324 can be taken.

For example, at timeline event E3, the software product has the needed code base so as to implement a variation of feature F5 using a new look-and-feel (e.g., using F5 new UI code 314) and/or the 'old' version of feature F5 using the 'old' look-and-feel, but using the new F5 back-end code 334. The old version of F5 is implemented using F5 spoof old UI code 308. The F5 old UI code 320 and the F5 old back-end code 340 are unused and can be deprecated or deleted.

Timeline event E4 depicts a point in time when the implementation of F5 spoof old UI code 308 and F5 new UI code 314 have been ratified. Then both can be merged back into the V1U code base (see merge 317 and merge 309). Also, when the implementation of F5 new back-end code 334 has been ratified, then it can be merged back into the V1 back-end code base (see merge 335).

Beyond timeline event E4, additional features can be implemented using the spoofing technique. As shown, development of a new feature F6 can be approached by branching at timeline event E4 for development of F6 new UI code 316 (see F6 UI branch 330), which can be concurrent with branching at timeline event E4 for development of F6 spoof old UI code 310 (see F6 UI spoof branch 328). Back-end code for feature F6 can be branched at timeline event E4 for development of F6 new back-end code 336 (see F6 back-end branch 341). The new feature F6 can be launched at timeline event E5, and such a launch will include code-level support for both the new F6 UI and its new back-end functionality as well the spoofed UI for old feature F6. The unmodified F6 old back-end code 342, and the unmodified F6 old UI code 322, may be present and possibly marked as deprecated and/or possibly deleted.

FIG. 3B exemplifies an incremental UI upgrade and old code deletion approach 3B00. As an option, one or more variations of an incremental UI upgrade and an old code deletion approach 3B00 or any aspect thereof may be implemented in the context of the architecture and functionality of the embodiments described herein. Also, the incremental UI upgrade and old code deletion approach 3B00 or any aspect thereof may be implemented in any environment.

As shown, any time after go-live event for new feature F4, the old back-end code for F4 can be deleted. The deprecation of the old code has the effect of eliminating the need to carry or otherwise maintain the old F4 back-end code. This approach can be performed as additional features are defined, developed, and deployed, for example, any time after go-live event for new feature F5, the old back-end code for F5 can be deleted.

Listeners and Event Handlers

In some cases, a UI relies on listeners or event handlers (e.g., implemented in behavioral code) to handle user input and to implement behaviors for UI elements. For example, a menu item can be coded in HTML as a 'dropdown' menu, and a listener can be coded and enabled so as to respond to a user's interaction with the UI, such as through a selection of one of a plurality of menu item possibilities. Such a separation between an element present in a UI and its behavior can be implemented under a coding regime involving correlated HTML, CSS and JavaScript. The UI portion of any of the aforementioned spoof elements (e.g., F4 spoof old UI code 306 and/or F5 spoof old UI code 308) can be implemented in a combination of HTML and CSS. Corresponding behaviors can be implemented in JavaScript. Such a coding regime can be observed when implementing a web application. Moreover, using the spoofing techniques described herein, a web application using HTML, CSS and JavaScript can be used to enable incremental UI deployment.

The aforementioned look-and-feel aspects of presentation can vary between an old UI presentation and a new UI presentation. Table 1 presents an "old UI" aspect of a UI as compared with a "new UI" presentation.

TABLE 1

| Old UI | New UI |
| --- | --- |
| Navigation on left | Navigation on right |
| Appearance of "button1" | Absence of "button1" |
| FieldA (text box) | FieldA (auto-filled from FieldB) |
| White table | Black table |

Figure 7:
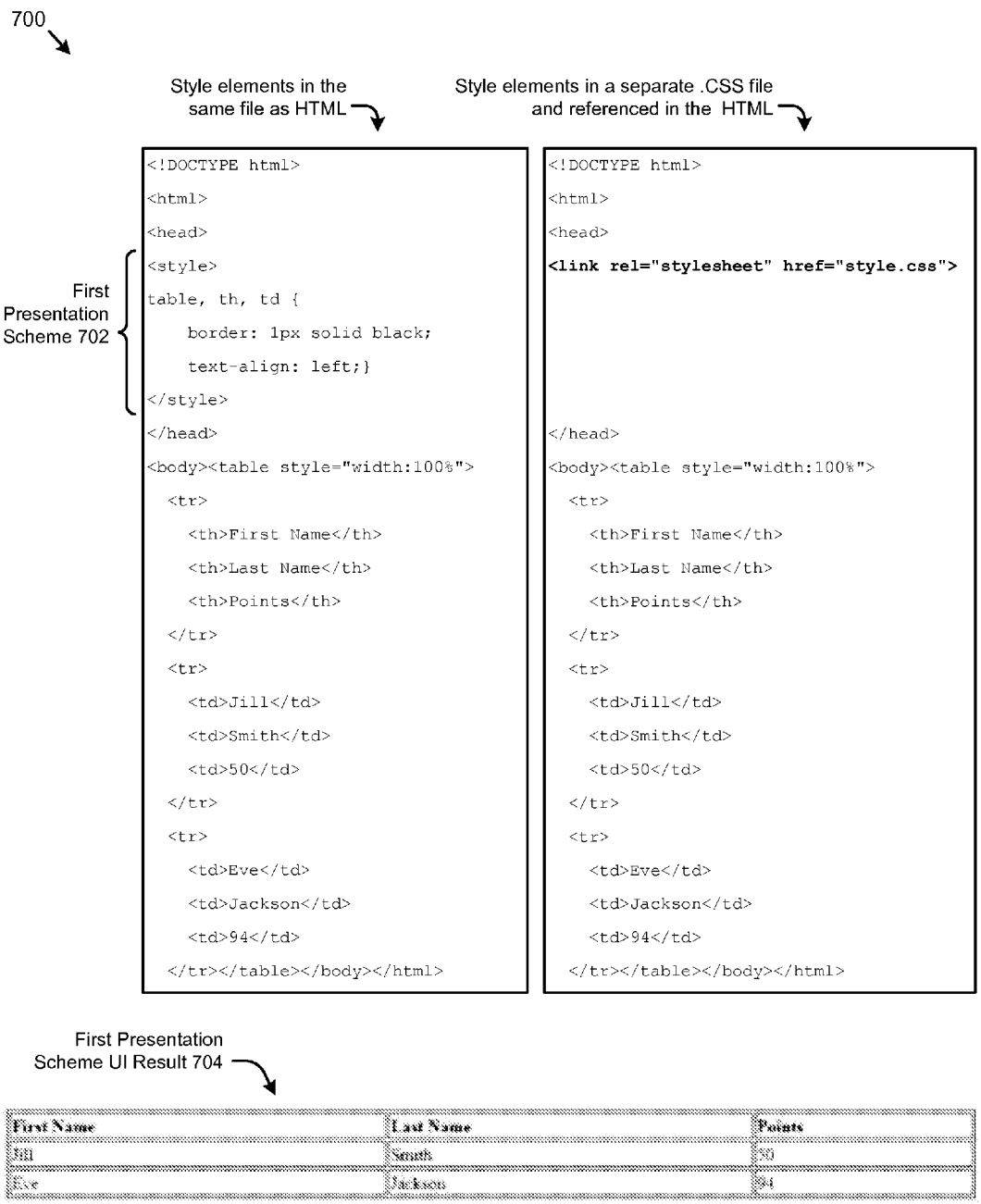
FIG. 7 presents an example of a first presentation scheme using HTML and style elements to control look-and-feel aspects of a UI in systems that implement web applications using HTML, CSS and JavaScript, according to an embodiment.
Figure 8:
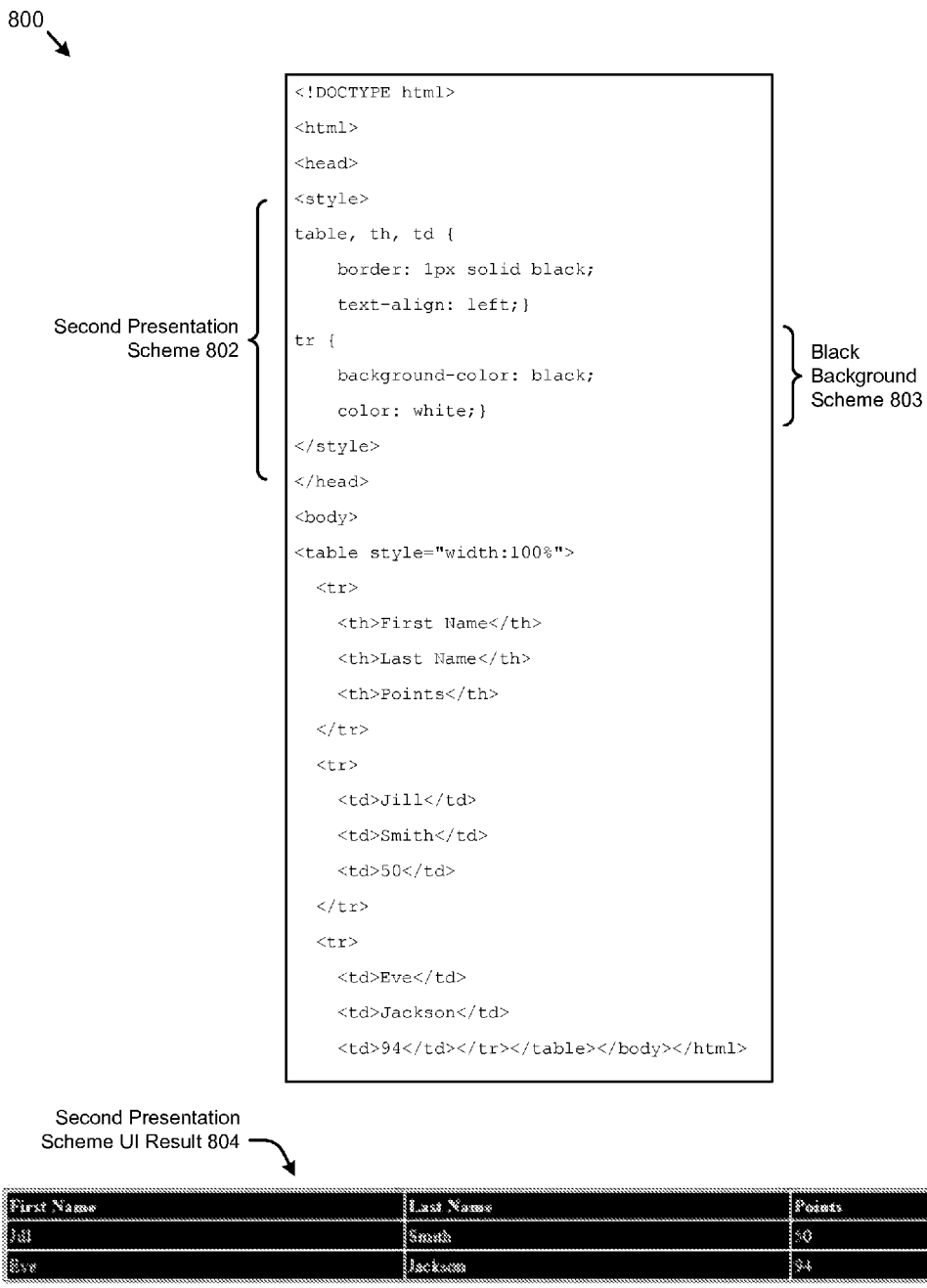
FIG. 8 presents an example of a second presentation scheme using HTML and style elements to control look-and-feel aspects of a UI in systems that implement web applications using HTML, CSS and JavaScript, according to an embodiment.

Additional variations between an "old UI" aspect of a UI and a "new UI" presentation are given hereunder. In particular, FIG. 7 and FIG. 8 provide a code-level example of changing a "white table listing" to a "black table listing".

Figure 4A:
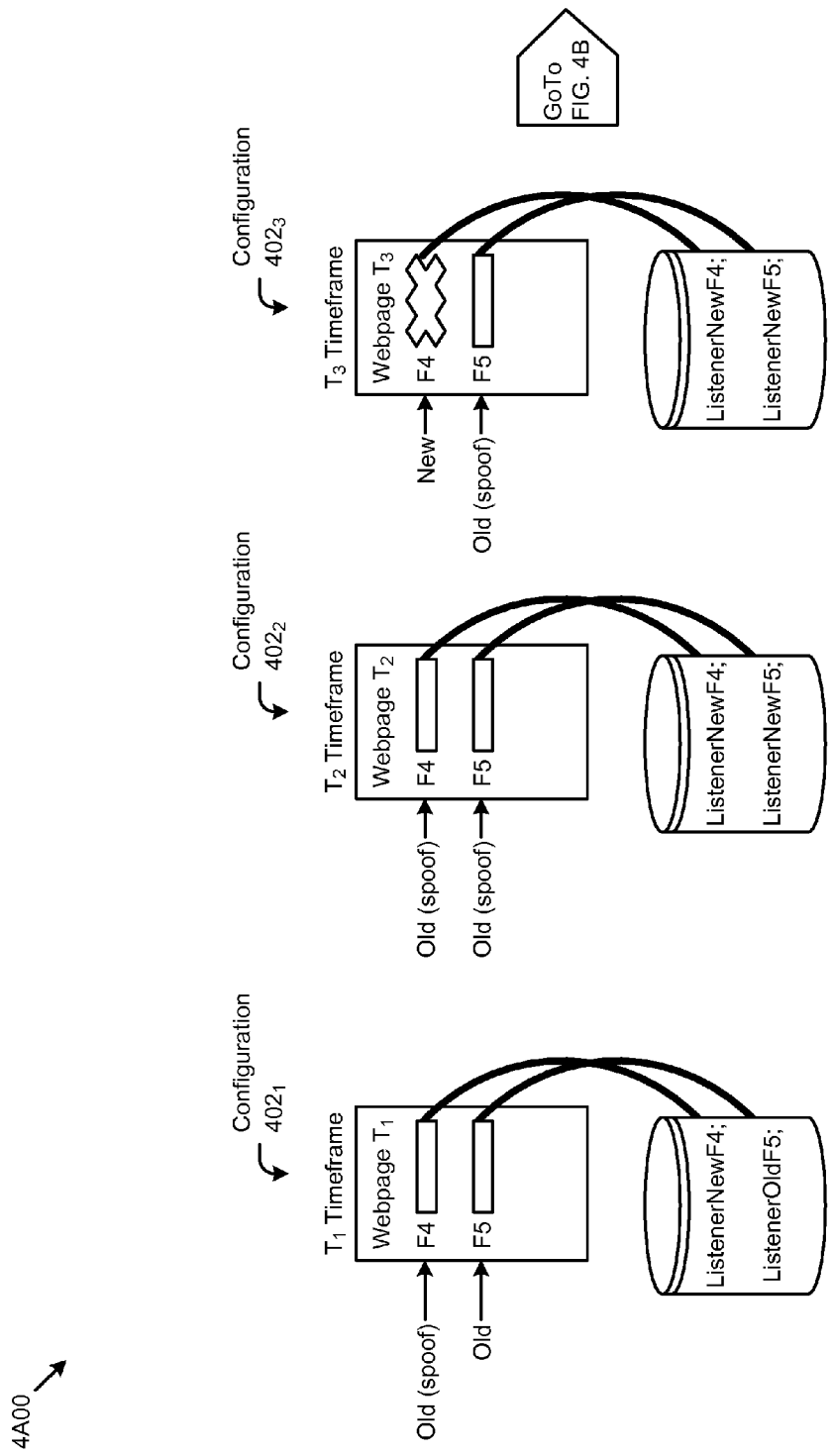
FIG. 4A and FIG. 4B depict incremental UI deployment sequences using spoofing UI code in systems that implement web applications using HTML, CSS and JavaScript, according to some embodiments.
Figure 4B:
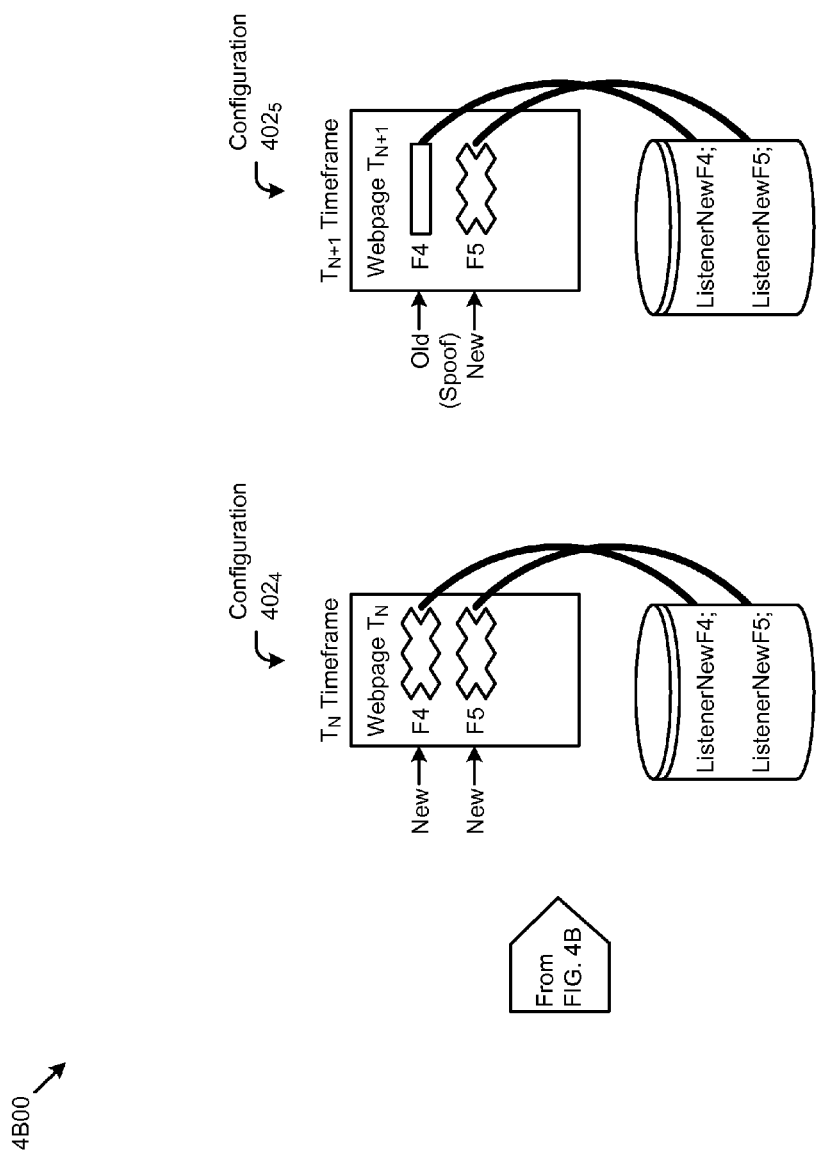

FIG. 4A and FIG. 4B depict incremental UI deployment sequences using spoofing UI code in systems that implement web applications using HTML, CSS and JavaScript. As an option, one or more variations of the incremental UI deployment sequences or any aspects thereof may be implemented in the context of the architecture and functionality of the embodiments described herein. Also, the incremental UI deployment sequence 4A00 and/or the incremental UI deployment sequence 4B00 or any aspects thereof may be implemented in any environment.

The incremental UI deployment sequence 4A00 of FIG. 4A is merely one example, and other deployment sequences are possible. As shown, a first configuration $402_1$ is deployed over the $T_1$ timeframe. The first configuration $402_1$ includes an old implementation of feature F5, specifically implemented using the old feature F5 UI and old behavioral code for feature F5 (see ListenerOldF5). Also, first configuration $402_1$ includes a new implementation of feature F4 (ListenerNewF4) and, as shown, the new listener for feature F4 responds to the spoof of the old UI for feature F4. This configuration supports testing of ListenerNewF4 without showing any modification of feature F5. This process can be repeated (e.g., see configuration $402_2$) so as to incrementally roll out new behavioral code for a feature with a spoof of the old feature so as to release and test the new behavior without forcing users to see changes to the UI for the corresponding feature. At some point, such as is depicted in configuration $402_3$ for the $T_3$ timeframe, a new UI for the new feature can be incrementally released. As shown, the new UI for feature F4 is released in synch with its respective new behavior (see ListenerNewF4). Any of the listeners in the foregoing can rely on processing that is implemented in a back-end. In some cases a listener or event handler makes API calls to access services of the back-end.

Still more incremental releases are depicted in the incremental UI deployment sequence 4B00 of FIG. 4B. Specifically, configuration $402_4$ depicts release of new feature F4 at the same time as release of new feature F5, both of which are in synch with respective new listeners.

In some scenarios, a new feature or, more specifically, a new UI element for a new feature, is deemed to be unacceptable by the user community, or is found to be inconsistent with the deployed system as a whole, and would need to be "rolled back". Configuration $402_5$ depicts such a scenario. The rollback shown at the $T_{n+1}$ timeframe can be accomplished by enabling the old (spoof) presentation and old behavior for feature F4 and contemporaneously disabling the new presentation and behavior for feature F4 (as shown).

The choice to enable a particular UI configuration and disable a different configuration can be accomplished with a software switch (e.g., an if-then-else or other conditional software test). Such a software switch and/or its conditional tests can refer to a local variable in performing the test, and/or can refer to a variable of wider scope, possibly even an enable-disable variable that is published for access from any scope.

Figure 5A:
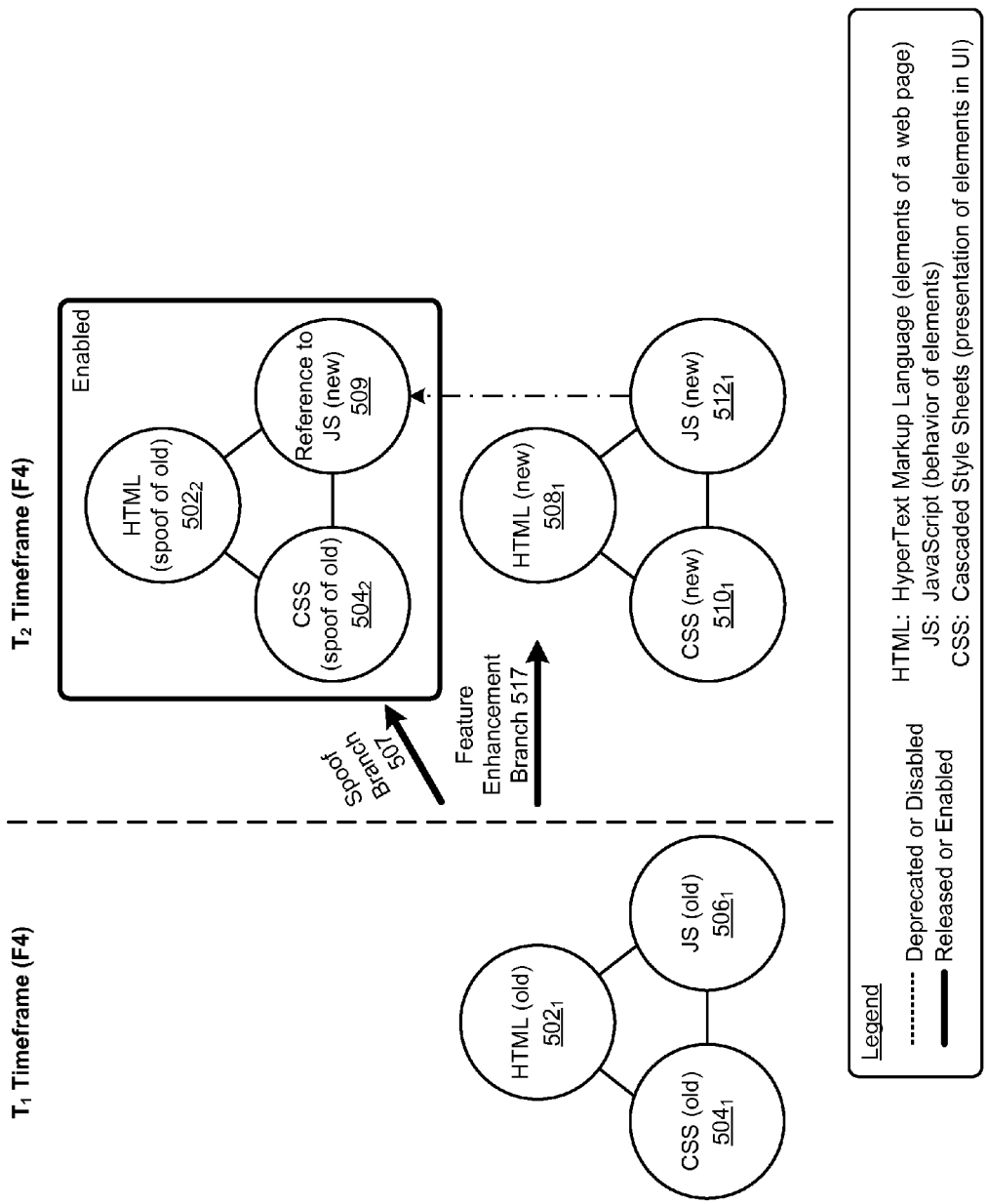
FIG. 5A depicts an incremental UI deployment sequence using a spoofing branch in systems that implement web applications using HTML, CSS and JavaScript, according to an embodiment.
Figure 5B:
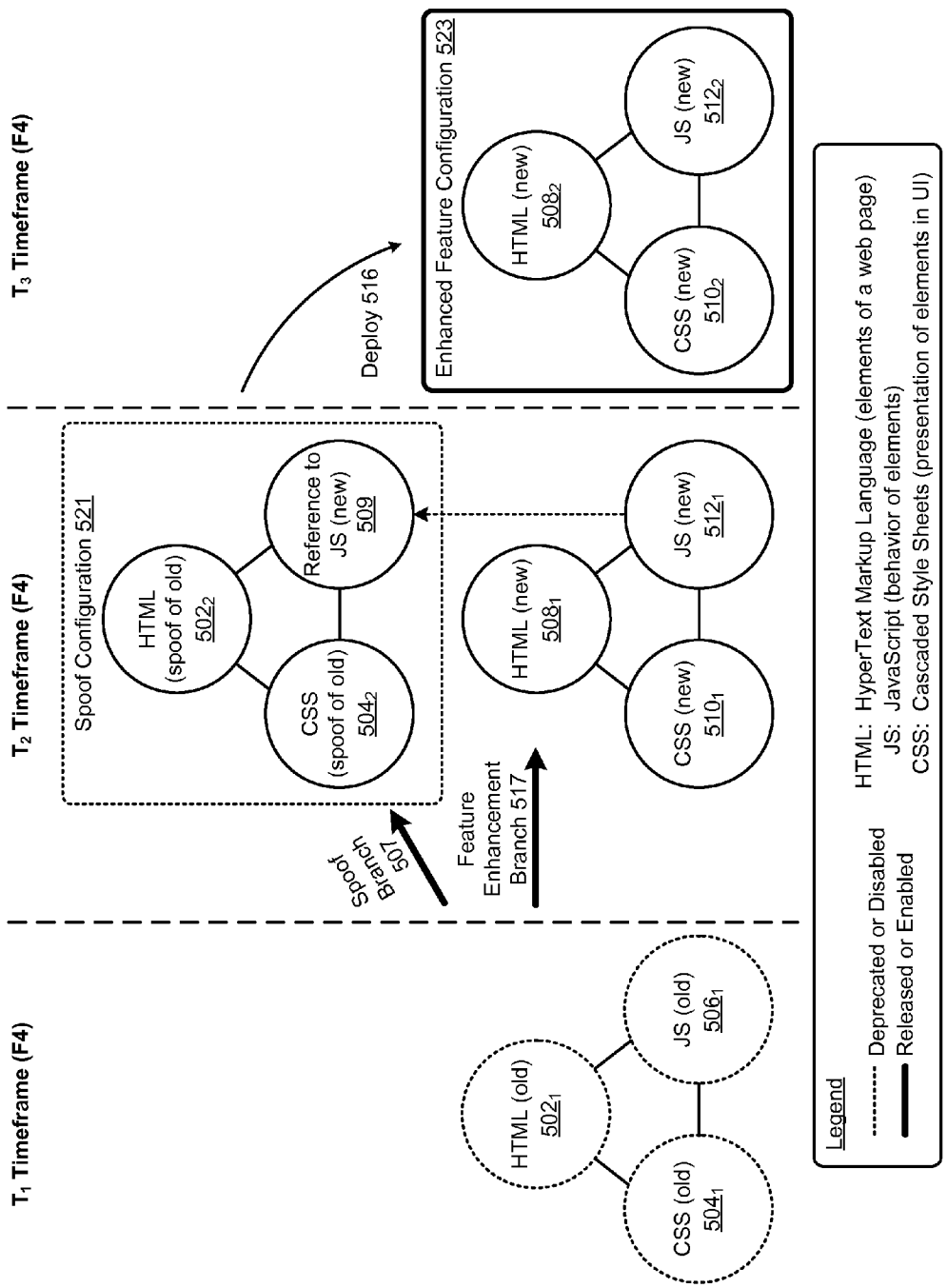
FIG. 5B depicts an incremental UI new feature deployment sequence from a spoofing branch in systems that implement web applications using HTML, CSS and JavaScript, according to an embodiment.
Figure 5C:
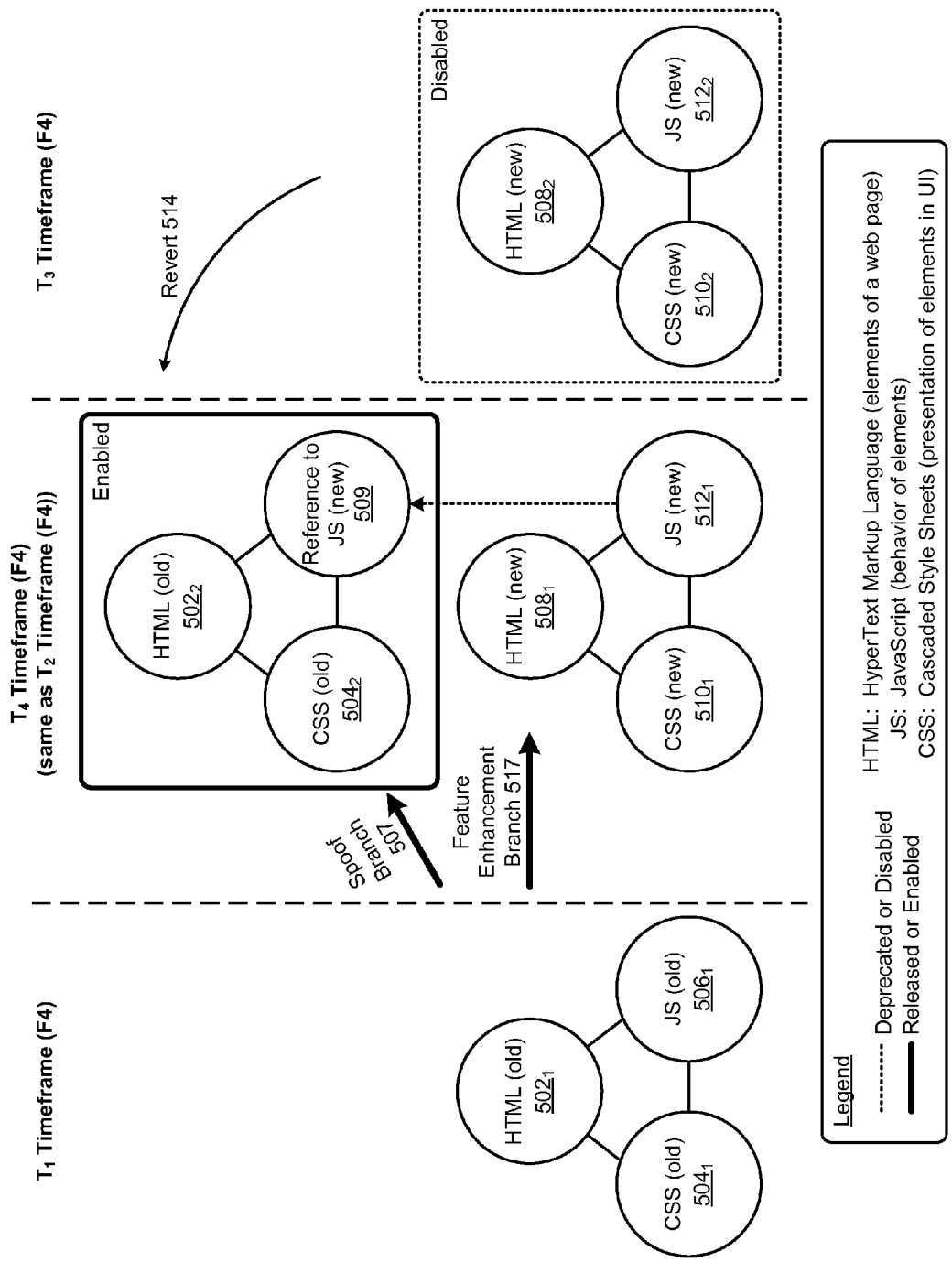
FIG. 5C depicts an incremental UI roll-back sequence using a spoofing branch in systems that implement web applications using HTML, CSS and JavaScript, according to an embodiment.

FIG. 5A, FIG. 5B and FIG. 5C depict incremental UI deployment sequences using a spoofing branch in systems that implement web applications using HTML, CSS and JavaScript. As an option, one or more variations of incremental UI deployment sequences or any aspects thereof may be implemented in the context of the architecture and functionality of the embodiments described herein.

In timeframe T1 a particular feature (see feature F4) is enabled. At some point the developers might want to enhance feature F4 to have new behavior as well as a new look-and-feel as well as (possibly) a new UI element. In web applications using HTML, CSS and JavaScript, an incremental UI deployment sequence can be implemented using the aforementioned spoofing technique. As shown, development of the enhancements to the feature F4 can be accomplished by branching code along two branches, namely along the spoof branch 507 and along the feature enhancement branch 517. The old (pre-enhancement) configuration comprises HTML, CSS and JavaScript, specifically old or unenhanced HTML code $502_1$, unenhanced CSS code $504_1$, and unenhanced JavaScript code $506_1$. The aforementioned code development branches are taken such that in timeframe $T_2$, there are two configurations of HTML, CSS and JavaScript, one of which is enabled. Specifically, and as shown in timeframe $T_2$, the first configuration comprising spoof HTML $502_2$, spoof CSS $504_2$, and JavaScript reference 509 (e.g., a reference to new JavaScript $512_1$) is enabled. It is also possible that the spoof HTML $502_2$ is purposely identical to the new HTML, nevertheless the configuration can support two different look and feel presentations based on changes in the CSS of the configuration.

The second configuration is made available, and is consistent among its configuration constituents, but it is not (yet) enabled. This second configuration comprises HTML $508_1$, new CSS $510_1$, and new JavaScript $512_1$. As shown, the code available in timeframe $T_2$ implements the old look-and-feel of feature F4 using the spoof HTML $502_2$, spoof CSS $504_2$, and the shown JavaScript reference 509 to new JavaScript $512_1$.

In some future timeframe, the spoof configuration can be disabled at the same time that the new feature enhanced code is enabled. This scenario is depicted in FIG. 5B. Specifically, in timeframe T3, the newly-enhanced feature F4 can be deployed (see deploy action 516). The deployment action involves disabling of the spoof configuration 521, and concurrently enabling the enhanced feature configuration 523, which is composed of an enabled instance of HTML $508_1$, an enabled instance of new CSS $510_2$, and an enabled instance of new JavaScript $512_2$, (namely, HTML $508_2$, new CSS $510_2$, and new JavaScript $512_2$, as shown).

In some further future timeframe, a roll-back or revert action 514 can be effected. Specifically, in a roll-back action, the spoof configuration can be re-enabled at the same time that the new feature enhanced code is disabled. This scenario is depicted in FIG. 5C. Specifically, in timeframe T3, roll-back can move into timeframe T4, which has the same configuration as was shown in timeframe T2. The newly-enhanced feature F4 can be disabled (see revert action 514). As shown, the revert action 514 involves disabling the enhanced feature configuration 523 while concurrently enabling the spoof configuration 521 as shown in FIG. 5B.

Figure 6:
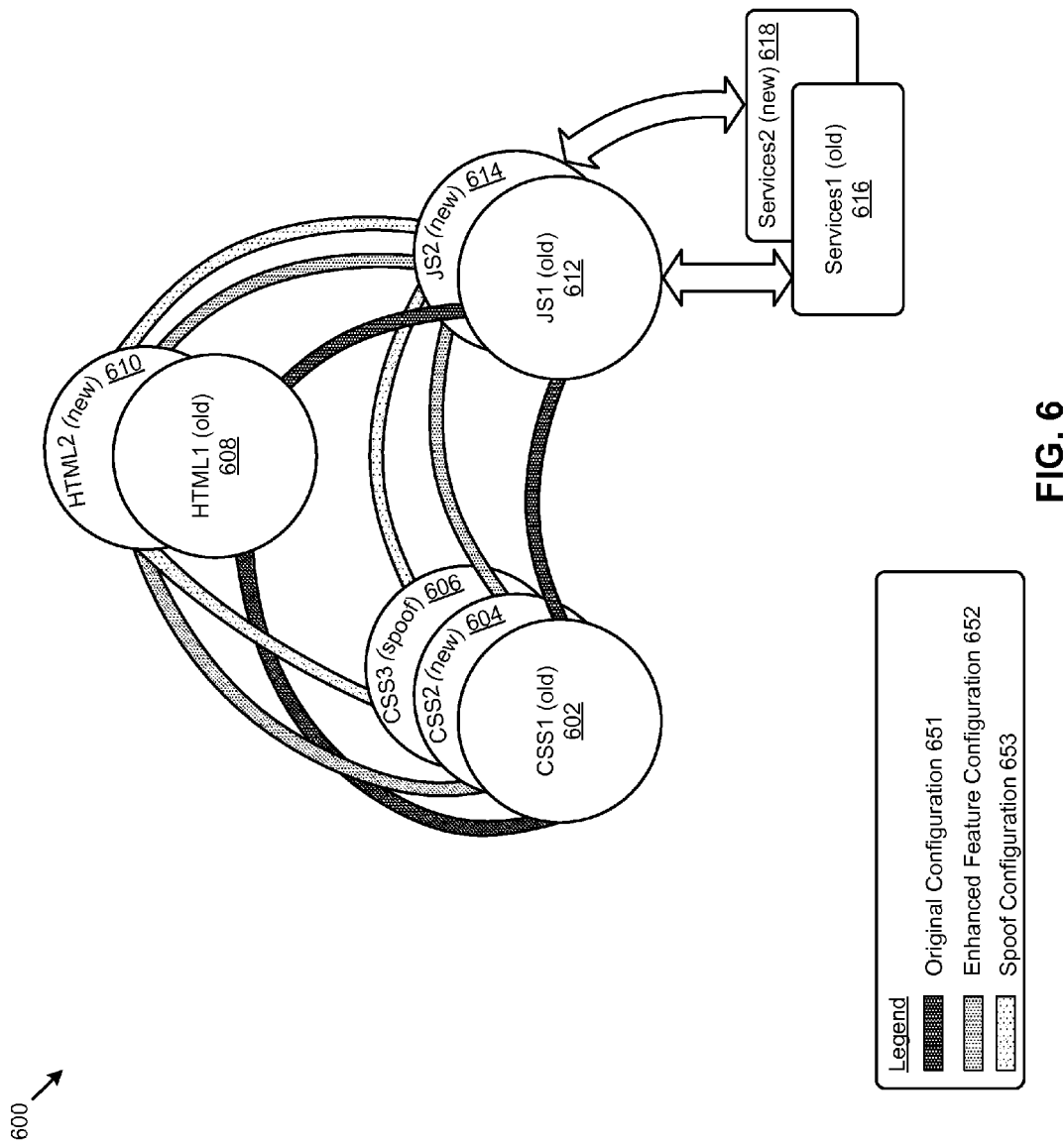
FIG. 6 presents an example of code relationships when using spoofing code in systems that implement a HTML, CSS and JavaScript front-end UI that relies on back-end infrastructure.

FIG. 6 presents an example of code relationships 600 when using spoofing code in systems that implement a HTML, CSS and JavaScript front-end UI that relies on back-end infrastructure. As an option, one or more variations of code relationships 600 or any aspect thereof may be implemented in the context of the architecture and functionality of the embodiments described herein. Also, the code relationships 600 or any aspect thereof may be implemented in any environment.

The depiction of FIG. 6 includes representations of types of code, namely HTML, CSS and JavaScript. The code representations are labeled (e.g., CSS1, CSS2, CSS3, HTML1, HTML2, etc.). Further, several configurations are shown using the linkages. The legend indicates three configurations, namely an original configuration (e.g., using CSS1 602, HTML1 608, and JS1 612); a spoof configuration (e.g., CSS3 606, HTML2 610, and JS2 614); and an enhanced feature configuration (e.g., CSS2 604, HTML2 610, and JS2 614)).

Various back-end services can be provided in any configuration. Specifically, and as shown, JS1 612 avails of services1 616 and JS2 614 avails of services2 618.

FIG. 7 presents an example of a first presentation scheme 700 using HTML and style elements to control look-and-feel aspects of a UI in systems that implement web applications using HTML, CSS and JavaScript. As an option, one or more variations of first presentation scheme 700 or any aspect thereof may be implemented in the context of the architecture and functionality of the embodiments described herein. Also, the first presentation scheme 700 or any aspect thereof may be implemented in any environment.

The code shown in FIG. 7 implements a first presentation scheme 702. The left panel includes <style> elements inline in the HTML, The right panel includes a reference to <style> elements that are codified in a separate file. Either or both of the aforementioned techniques to use <style> elements can be used in any environment. Some implementations use only HTML and CSS in separate files.

Regardless of the specific coding choices (e.g., to include elements inline in the HTML or to includes a reference to <style> elements that are codified in a separate file), HTML elements can be considered separately from the presentation of those elements. In the particular example of FIG. 7, the style implements a first presentation scheme 702 that color-codes the table as having no background color. Such a table is shown in FIG. 7 as a white table that is identified as the first presentation scheme UI result 704 (see the bottom portion of FIG. 7). The background color and other stylistic characteristics can be changed by merely changing the CSS <style> elements. Such a change in the stylistic characteristics is given in FIG. 8.

FIG. 8 presents an example of a second presentation scheme 800 using HTML and style elements to control look-and-feel aspects of a UI in systems that implement web applications using HTML, CSS and JavaScript. As an option, one or more variations of second presentation scheme 800 or any aspect thereof may be implemented in the context of the architecture and functionality of the embodiments described herein. Also, the second presentation scheme 800 or any aspect thereof may be implemented in any environment.

The embodiment shown in FIG. 8 is merely one example of changing stylistic characteristics by merely changing the CSS <style> elements. As shown, the second presentation scheme 802 is codified using the <style> tags. More specifically, in this particular example, the table rows are specified as "background-color: black;". The black background scheme 803 results in the black background of the table labeled as second presentation scheme UI result 804 (see the bottom portion of FIG. 8).

In this manner (e.g., with style characteristics codified either inline in the HTML or included via a reference to <style> elements that are codified in a separate file), the style characteristics can be managed separately from the HTML elements.

Figure 9:
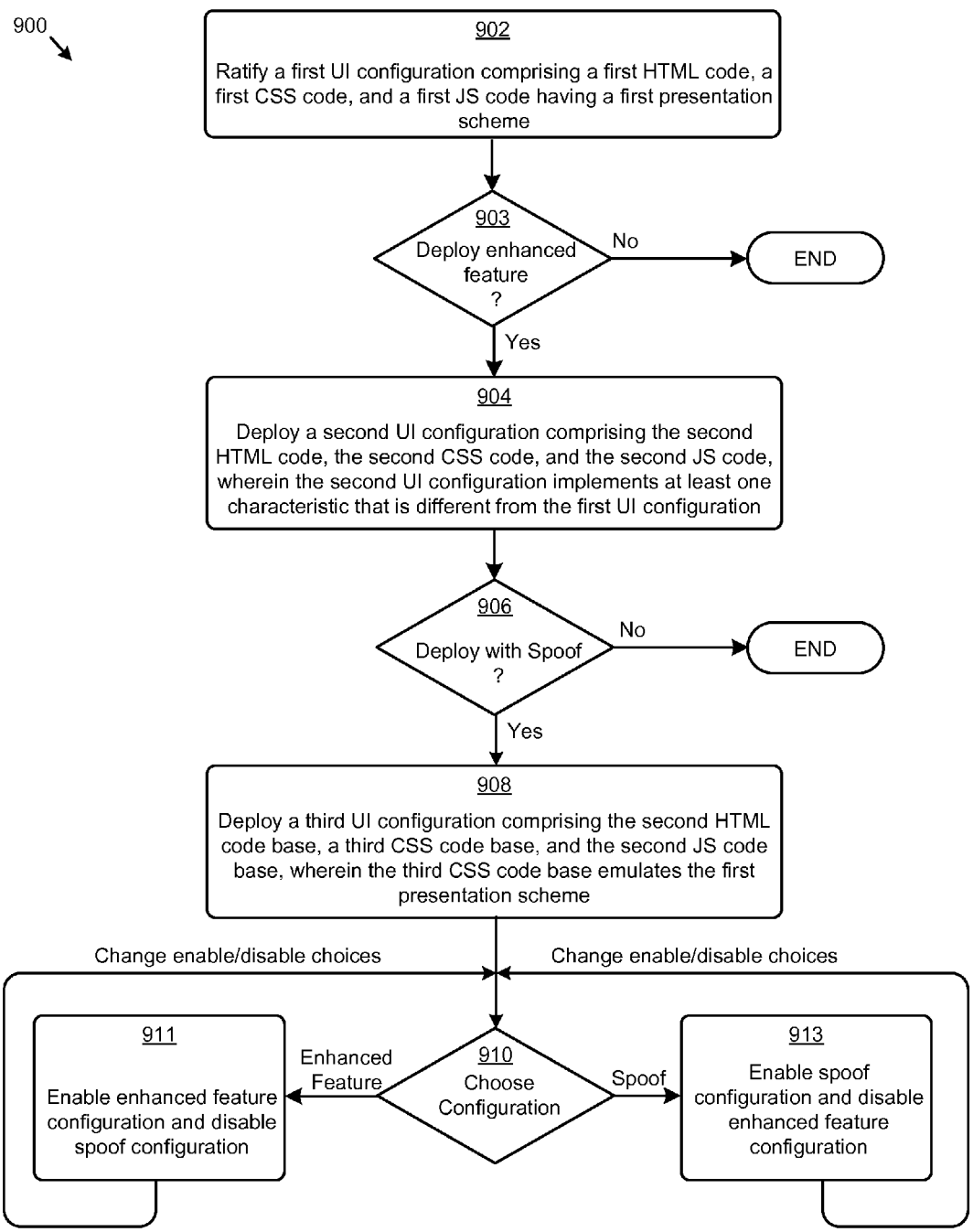
FIG. 9 is a flowchart depicting an operation flow when using spoofing code during deployment and revert operations.

FIG. 9 is a flowchart 900 depicting an operation flow when using spoofing code during deployment and revert operations. As an option, one or more variations of flowchart 900 or any aspect thereof may be implemented in the context of the architecture and functionality of the embodiments described herein. Also, the flowchart 900 or any aspect thereof may be implemented in any environment.

The shown flow commences at step 902. A UI with a particular look-and-feel and behavior (e.g., original code configuration 651) is formed by first HTML code (e.g., HTML1 608), first CSS code (e.g., CSS1 602), and first JavaScript code (e.g., JS1 612). At some time a developer or agent will decide to deploy an enhanced feature (see decision 903), and if the enhanced feature is to be deployed, then the flow proceeds to step 904, or if decision 903 is not taken, then the flow ends. In step 904, a second UI configuration (e.g., enhanced feature configuration 652) is deployed, where the second UI configuration is formed by second HTML code (e.g., HTML2 610), second CSS code (e.g., CSS2 604), and second JavaScript code (e.g., JS2 614).

For any of the reasons heretofore discussed, or for any other reason, a developer or agent will decide to deploy a spoof version of the original feature (see decision 906) using portions of new code. If decision 906 is not taken, then the flow ends, otherwise, the flow proceeds to step 908. In step 908, a third UI configuration (e.g., spoof configuration 653) is deployed, where the third UI configuration is formed by the second HTML code (e.g., HTML2 610), a third CSS code segment (e.g., CSS3 606), and the second JavaScript code (e.g., JS2 614). The third configuration serves to emulate (e.g., spoof) the look-and-feel and behavior of the original code configuration 651.

The developer or agent can decide to enable a particular configuration (see decision 910). For example, and as shown, the developer can enable the enhanced feature configuration and at the same time disable the spoof configuration (see step 911). Or, the developer can enable the spoof configuration and at the same time disable the enhanced feature configuration (see step 913). At some point in time, the constituents of the original code configuration can be deprecated and/or deleted.

Additional Embodiments of the Disclosure

Additional Practical Application Examples

Figure 10A:
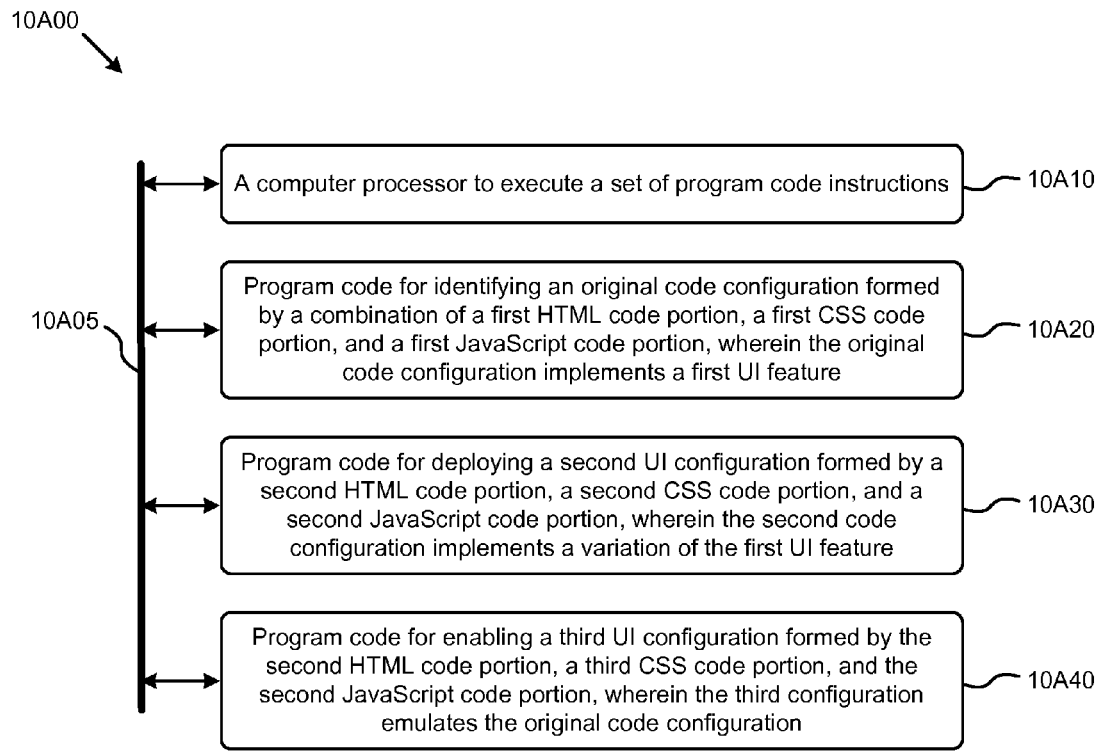
FIG. 10A and FIG. 10B depict system components as arrangements of computing modules that are interconnected so as to implement certain of the herein-disclosed embodiments.

FIG. 10A depicts a system 10A00 as an arrangement of computing modules that are interconnected so as to operate cooperatively to implement certain of the herein-disclosed embodiments. The partitioning of system 10A00 is merely illustrative and other partitions are possible. The partitioning of system 10A00 is merely illustrative and other partitions are possible. As an option, the present system 10A00 may be implemented in the context of the architecture and functionality of the embodiments described herein. Of course, however, the system 10A00 or any operation therein may be carried out in any desired environment.

The system 10A00 comprises at least one processor and at least one memory, the memory serving to store program instructions corresponding to the operations of the system. As shown, an operation can be implemented in whole or in part using program instructions accessible by a module. The modules are connected to a communication path 10A05, and any operation can communicate with other operations over communication path 10A05. The modules of the system can, individually or in combination, perform method operations within system 10A00. Any operations performed within system 10A00 may be performed in any order unless as may be specified in the claims.

The shown embodiment implements a portion of a computer system, presented as system 10A00, comprising a computer processor to execute a set of program code instructions (see module 10A10) and modules for accessing memory to hold program code instructions to perform: identifying an original code configuration formed by a combination of a first HTML code portion, a first CSS code portion, and a first JavaScript code portion, wherein the original code configuration implements a first UI feature (see module 10A20); deploying a second UI configuration formed by a second HTML code portion, a second CSS code portion, and a second JavaScript code portion, wherein the second code configuration implements a variation of the first UI feature (see module 10A30); and enabling a third UI configuration formed by the second HTML code portion, a third CSS code portion, and the second JavaScript code portion, wherein the third configuration emulates the original code configuration (see module 10A40).

Figure 10B:
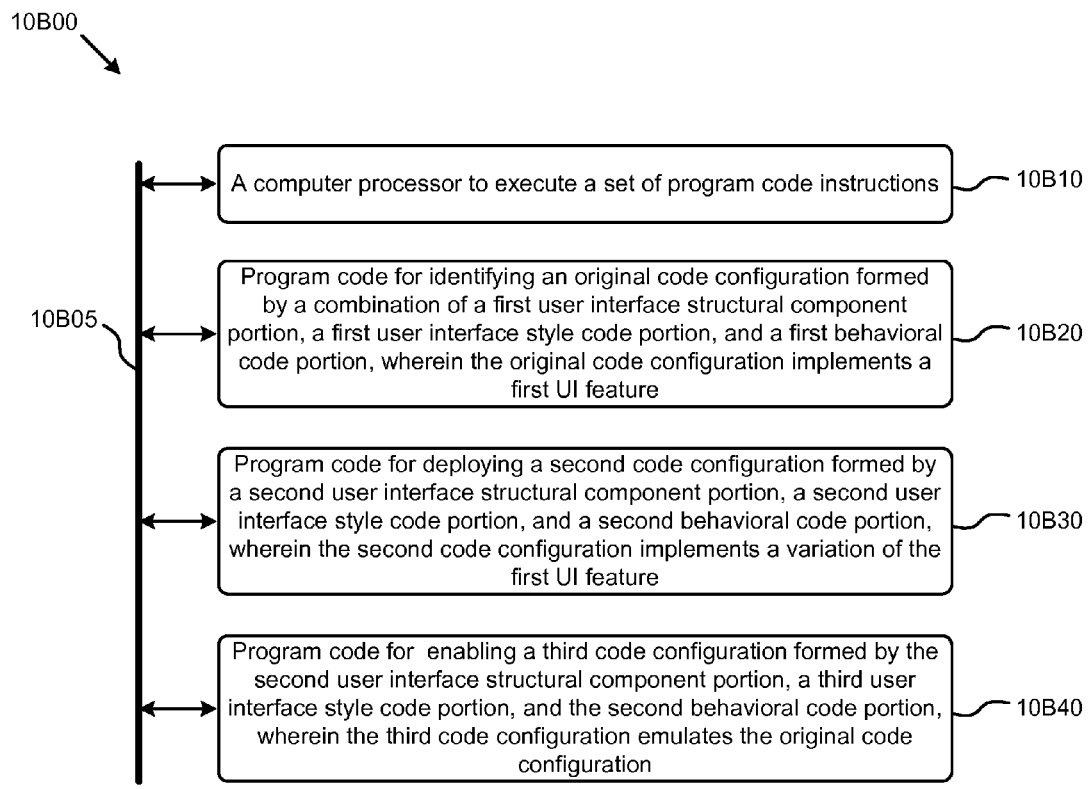

FIG. 10B depicts a system 10B00 as an arrangement of computing modules that are interconnected so as to operate cooperatively to implement certain of the herein-disclosed embodiments. The partitioning of system 10B00 is merely illustrative and other partitions are possible. As an option, the present system 10B00 may be implemented in the context of the architecture and functionality of the embodiments described herein. Of course, however, the system 10B00 or any operation therein may be carried out in any desired environment. The system 10B00 comprises at least one processor and at least one memory, the memory serving to store program instructions corresponding to the operations of the system. As shown, an operation can be implemented in whole or in part using program instructions accessible by a module. The modules are connected to a communication path 10B05, and any operation can communicate with other operations over communication path 10B05. The modules of the system can, individually or in combination, perform method operations within system 10B00. Any operations performed within system 10B00 may be performed in any order unless as may be specified in the claims. The shown embodiment implements a portion of a computer system, presented as system 10B00, comprising a computer processor to execute a set of program code instructions (see module 10B10) and modules for accessing memory to hold program code instructions to perform: identifying an original code configuration formed by a combination of a first user interface structural component portion, a first user interface style code portion, and a first behavioral code portion, wherein the original code configuration implements a first UI feature (see module 10B20); deploying a second code configuration formed by a second user interface structural component portion, a second user interface style code portion, and a second behavioral code portion, wherein the second code configuration implements a variation of the first UI feature (see module 10B30); and enabling a third code configuration formed by the second user interface structural component portion, a third user interface style code portion, and the second behavioral code portion, wherein the third code configuration emulates the original code configuration (see module 10B40).

System Architecture Overview

Additional System Architecture Examples

Figure 11A:
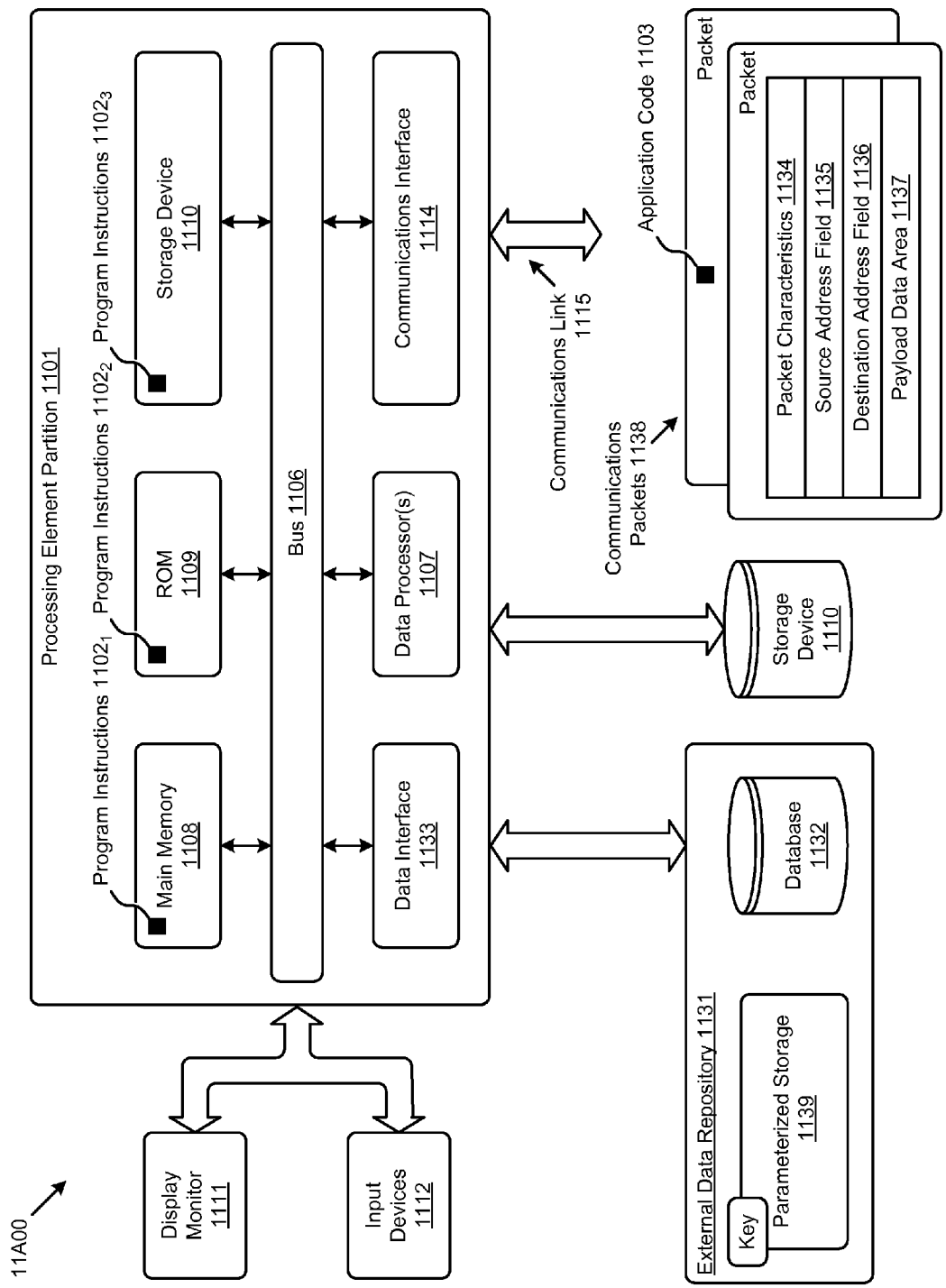
FIG. 11A and FIG. 11B depict exemplary architectures of components suitable for implementing embodiments of the present disclosure, and/or for use in the herein-described environments.

FIG. 11A depicts a block diagram of an instance of a computer system 11A00 suitable for implementing embodiments of the present disclosure. Computer system 11A00 includes a bus 1106 or other communication mechanism for communicating information. The bus interconnects subsystems and devices such as a central processing unit (CPU), or a multi-core CPU (e.g., data processor 1107), a system memory (e.g., main memory 1108, or an area of random access memory (RAM)), a non-volatile storage device or non-volatile storage area (e.g., read-only memory 1109), an internal or external storage device 1110 (e.g., magnetic or optical), a data interface 1133, a communications interface 1114 (e.g., PHY, MAC, Ethernet interface, modem, etc.). The aforementioned components are shown within processing element partition 1101, however other partitions are possible. The shown computer system 11A00 further comprises processing elements (e.g., processing element $1103_1$), a display 1111 (e.g., CRT or LCD), various input devices 1112 (e.g., keyboard, cursor control), and an external data repository 1131.

According to an embodiment of the disclosure, computer system 11A00 performs specific operations by data processor 1107 executing one or more sequences of one or more program code instructions contained in a memory. Such instructions (e.g., program instructions $1102_1$, program instructions $1102_2$, program instructions $1102_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 11A00 performs specific networking operations using one or more instances of communications interface 1114. Instances of the communications interface 1114 may comprise one or more networking ports that are configurable (e.g., pertaining to speed, protocol, physical layer characteristics, media access characteristics, etc.) and any particular instance of the communications interface 1114 or port thereto can be configured differently from any other particular instance. Portions of a communication protocol can be carried out in whole or in part by any instance of the communications interface 1114, and data (e.g., packets, data structures, bit fields, etc.) can be positioned in storage locations within communications interface 1114, or within system memory, and such data can be accessed (e.g., using random access addressing, or using direct memory access DMA, etc.) by devices such as data processor 1107.

The communications link 1115 can be configured to transmit (e.g., send, receive, signal, etc.) any types of communications packets 1138 comprising any organization of data items. The data items can comprise a payload data area 1137, a destination address 1136 (e.g., a destination IP address), a source address 1135 (e.g., a source IP address), and can include various encodings or formatting of bit fields to populate the shown packet characteristics 1134. In some cases the packet characteristics include a version identifier, a packet or payload length, a traffic class, a flow label, etc. In some cases the payload data area 1137 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1107 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1131, which in turn can be formatted into any one or more storage areas, and which can comprise parameterized storage 1139 accessible by a key (e.g., filename, table name, block address, offset address, etc.).

Execution of the sequences of instructions to practice certain embodiments of the disclosure are performed by a single instance of the computer system 11A00. According to certain embodiments of the disclosure, two or more instances of computer system 11A00 coupled by a communications link 1115 (e.g., LAN, PTSN, or wireless network) may perform the sequence of instructions required to practice embodiments of the disclosure using two or more instances of components of computer system 11A00.

The computer system 11A00 may transmit and receive messages such as data and/or instructions organized into a data structure (e.g., communications packets 1138). The data structure can include program instructions (e.g., application code 1103), communicated through communications link 1115 and communications interface 1114. Received program code may be executed by data processor 1107 as it is received and/or stored in the shown storage device or in or upon any other non-volatile storage for later execution. Computer system 11A00 may communicate through a data interface 1133 to a database 1132 on an external data repository 1131. Data items in a database can be accessed using a primary key (e.g., a relational database primary key).

The processing element partition 1101 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1107. Some embodiments include one or more special-purpose hardware components (e.g., power control, logic, sensors, transducers, etc.).

Various implementations of the database 1132 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of incremental user interface deployment and deprecation using spoofing). Such files or records can be brought into and/or stored in volatile or non-volatile memory.

Figure 11B:
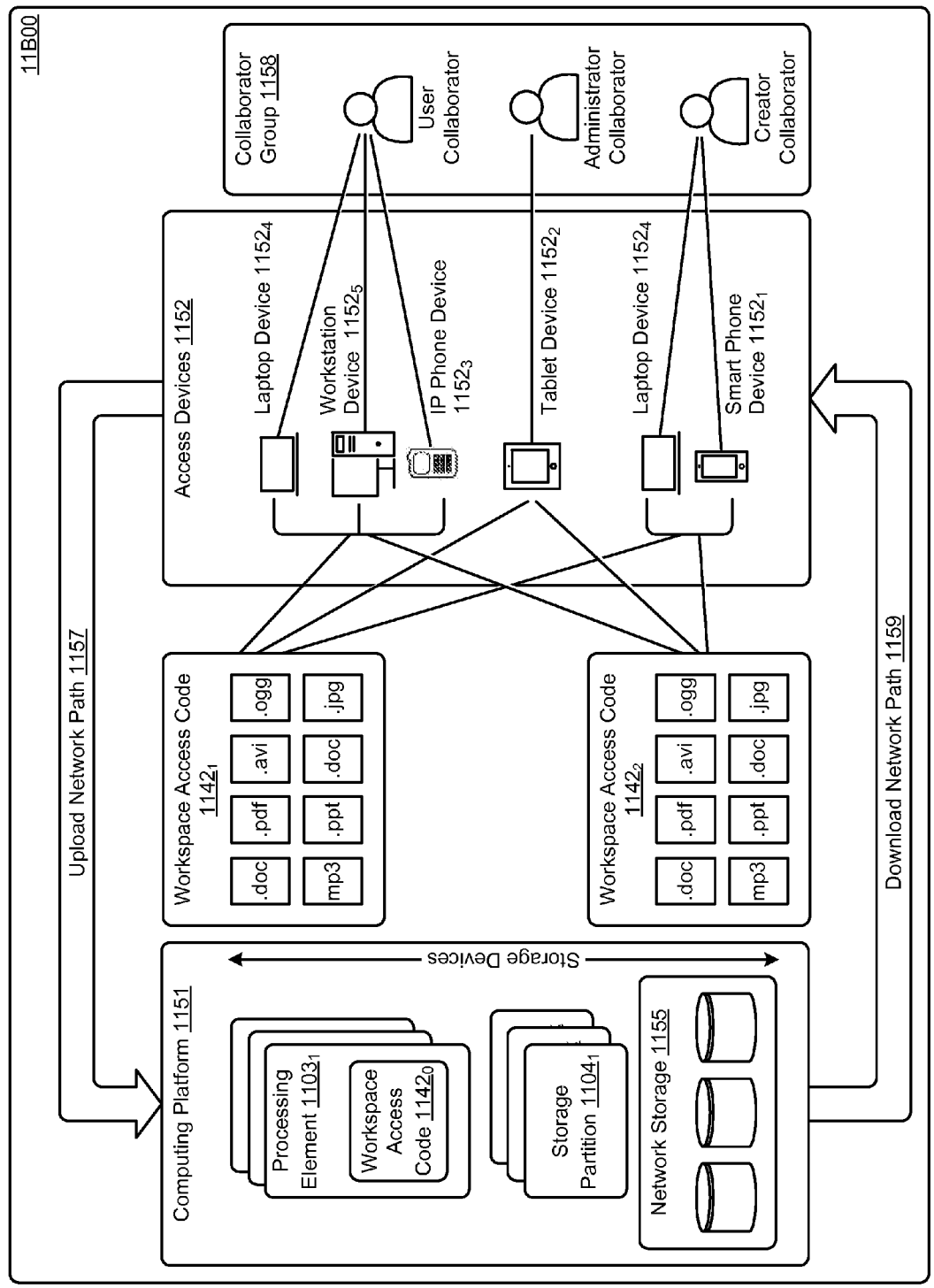

FIG. 11B depicts a block diagram of an instance of a cloud-based environment 11B00. Such a cloud-based environment supports access to workspaces through the execution of workspace access code (e.g., workspace access code $1142_0$, workspace access code $1142_1$, and workspace access code $1142_2$.) Workspace access code can be executed on any of the shown access devices 1152 (e.g., laptop device $1152_4$, workstation device $1152_5$, IP phone device $1152_3$, tablet device $1152_2$, smart phone device $1152_1$, etc.). A group of users can form a collaborator group 1158, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Also, a portion of the workspace access code can reside in and be executed on any computing platform 1151, including in a middleware setting. As shown, a portion of the workspace access code resides in and can be executed on one or more processing elements. The workspace access code can interface with storage devices such the shown networked storage 1155. Storage of workspaces and/or any constituent files or objects, and/or any other code or scripts or data can be stored in any one or more storage partitions (e.g., storage partition $1104_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over a network interface such as upload network path 1157). A stored workspace can be delivered to a particular user and/or shared with other particular users via a download (e.g., a download from a processing element to an access device over a network interface such as download network path 1159).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying a first code configuration formed by a combination of an original behavioral code portion, an original user interface style code portion, and an original user interface structural components portion, wherein the first code configuration implements a first UI feature, wherein the original user interface structural component portion comprises HTML markup, and wherein the original user interface style code portion comprises CSS code, and wherein the original behavioral code portion comprises JavaScript;
   generating a second code configuration that implements a second UI feature, the second code configuration formed by a new behavioral code portion, a new user interface style code portion, and a new user interface structural component portion, wherein the second code configuration implements the second UI feature; and
   releasing a third code configuration that emulates an appearance of the first code configuration with the second UI feature from the second code configuration, the third code configuration formed by new behavioral code portion, an emulation of the original user interface style code portion, and at least one of: (1) an emulation of the original user interface structural component portion or (2) the new user interface structural component portion.

2. The method of claim 1, further comprising enabling the third code configuration and disabling the second code configuration.

3. The method of claim 2, wherein enabling the third code configuration and disabling the second code configuration is performed using a software switch.

4. The method of claim 1, further comprising enabling the second code configuration and disabling the third code configuration.

5. The method of claim 1, wherein the new behavioral code portion further comprises at least one of, a listener, or an event handler that responds to user input.

6. The method of claim 1, wherein the second UI feature comprising at least one of a variation of the first UI feature or a new feature.

7. The method of claim 1, wherein the new user interface structural component portion comprises HTML markup, and wherein the new user interface style code portion comprises CSS code, and wherein the new behavioral code portion comprises JavaScript.

8. The method of claim 1, wherein the new user interface structural component portion comprises HTML markup, and wherein the emulation of the original user interface style code portion comprises CSS code, and wherein the new behavioral code portion comprises JavaScript.

9. A computer program product, embodied in a non-transitory computer readable medium, the non-transitory computer readable medium having stored thereon a sequence of instructions which, when stored in memory and executed by a processor causes the processor to perform a set of acts, the acts comprising:
    identifying a first code configuration formed by a combination of an original behavioral code portion, an original user interface style code portion, and an original user interface structural components portion, wherein the first code configuration implements a first UI feature, wherein the original user interface structural component portion comprises HTML markup, and wherein the original user interface style code portion comprises CSS code, and wherein the original behavioral code portion comprises JavaScript;
    generating a second code configuration that implements a second UI feature, the second code configuration formed by new behavioral code portion, a new user interface style code portion, and a new user interface structural component portion, wherein the second code configuration implements the second UI feature; and
    releasing a third code configuration that emulates an appearance of the first code configuration with the second UI feature from the second code configuration, the third code configuration formed by the new behavioral code portion, an emulation of the original user interface style code portion, and at least one of: (1) an emulation of the original user interface structural component portion or (2) the new user interface structural component portion.

10. The computer program product of claim 9, wherein enabling the third code configuration and disabling the second code configuration is performed using a software switch.

11. The computer program product of claim 9, wherein the new behavioral code portion further comprises at least one of, a listener, or an event handler that responds to user input.

12. The computer program product of claim 9, wherein the new behavioral code portion comprises a reference to JavaScript code that implements a variation of the first UI feature.

13. The computer program product of claim 9, wherein the new user interface structural component portion comprises HTML markup, and wherein the new user interface style code portion comprises CSS code, and wherein the new behavioral code portion comprises JavaScript.

14. The computer program product of claim 9, wherein the new user interface structural component portion comprises HTML markup, and wherein the emulation of the original user interface style code portion comprises CSS code, and wherein the new behavioral code portion comprises JavaScript.

15. A system comprising:
    a storage device to store a first code configuration formed by a combination of an original behavioral code portion, an original user interface style code portion, and an original user interface structural components portion, wherein the first code configuration implements a first UI feature, wherein the original user interface structural component portion comprises HTML markup, and wherein the original user interface style code portion comprises CSS code, and wherein the original behavioral code portion comprises JavaScript;
    a network interface to transmit a second code configuration that implements a second UI feature, the second code configuration formed by a new behavioral code portion, a new user interface style code portion, and a new user interface structural component portion, wherein the second code configuration implements the second UI feature; and
    a computing platform to release a third code configuration that emulates an appearance of the first code configuration with the second UI feature from the second code configuration, the third code configuration formed by the new behavioral code portion, an emulation of the original user interface style code portion, and at least one of: (1) an emulation of the original user interface structural component portion or (2) the new user interface structural component portion.

16. The system of claim 15, wherein the new user interface structural component portion comprises HTML markup, and wherein the new user interface style code portion comprises CSS code, and wherein the new behavioral code portion comprises JavaScript.

17. The system of claim 15, wherein the new user interface structural component portion comprises HTML markup, and wherein the emulation of the original user interface style code portion comprises CSS code, and wherein the new behavioral code portion comprises JavaScript.

* * * * *